United States Patent [19]
Berry et al.

[11] Patent Number: 6,026,237
[45] Date of Patent: Feb. 15, 2000

[54] SYSTEM AND METHOD FOR DYNAMIC MODIFICATION OF CLASS FILES

[75] Inventors: Robert Francis Berry; Riaz Y. Hussain, both of Austin, Tex.

[73] Assignee: International Business Machines Corporation, Armonk, N.Y.

[21] Appl. No.: 08/963,080

[22] Filed: Nov. 3, 1997

[51] Int. Cl.$^7$ ...................................................... G06F 9/45
[52] U.S. Cl. ............................................................ 395/704
[58] Field of Search ..................................... 395/704, 705

[56] References Cited

U.S. PATENT DOCUMENTS

| | | | |
|---|---|---|---|
| 4,821,220 | 4/1989 | Duisberg | 364/578 |
| 5,307,499 | 4/1994 | Yin | 395/700 |
| 5,459,868 | 10/1995 | Fong | 395/700 |
| 5,475,843 | 12/1995 | Halviatti et al. | 395/704 |
| 5,732,273 | 3/1998 | Srivastava et al. | 395/704 |
| 5,740,441 | 4/1998 | Yellin et al. | 395/704 |
| 5,815,718 | 9/1998 | Tock | 395/705 |

FOREIGN PATENT DOCUMENTS

| | | |
|---|---|---|
| 29600609 | 2/1997 | Germany . |
| WO 96/12224 | 4/1996 | WIPO . |

OTHER PUBLICATIONS

Rundensteiner, Design Tool Integration Using Object–Oriented Database Views. Proceedings of the IEEE/ACM international conference on computer–aided design. pp. 104–107, 1993.

Epstein et al. Introducing Object–Orientedness into a Breadth–First Introductory Curriculum. ACM SIGPLAN OOPS Messenger. vol. 4, No. 2. pp. 293–298, Apr. 1993.

Drossopoulou et al. What is Java Binary Compatibility? ACM Journal. pp. 341–358, Oct. 1998.

*Primary Examiner*—Tarq R. Hafiz
*Assistant Examiner*—Wei Zhen
*Attorney, Agent, or Firm*—Leslie A. Van Leeuwen; Jeffrey S. LaBaw

[57] ABSTRACT

The present invention is directed to a system and method for modifying a class file for the purpose of instrumentation, debugging, benchmarking, or making functional modifications to the class file. In addition, the present invention makes necessary changes to the components of the class file, so that the class file will pass the class file verifier before being executed. A class file is deconstructed into its components, and then selected components of the class file are modified by adding, deleting, or changing code within the components. The class file is then reconstructed, following all class file constraints imposed by the class file verifier. The present invention may also be used to modify selected code attributes of a network browser (i.e. a web browser) so that downloaded applets are saved to memory and modified before being executed by the information handling system. Class files may be modified without access to the source code, and the modified class files meet all constraints imposed by a class file verifier.

54 Claims, 5 Drawing Sheets

SYSTEM AND METHOD FOR DYNAMIC MODIFICATION OF CLASS FILES

FIELD OF THE INVENTION

The present invention relates to information processing systems and, more particularly, to software tools and methods for modifying class files for the purpose of performance instrumentation and measurement, debugging, benchmarking, and making functional modifications to the class files.

BACKGROUND OF THE INVENTION

The number of application programs written in Java is growing rapidly in number. One of the key reasons for this is the portability of Java code. A brief overview of Java is given below. For more detailed background information on the Java Virtual Machine and the Java language, see Lindholm and Yellin, "The Java Virtual Machine Specification," published by Addison-Wesley. Note that specifications for the Java language and the Java Virtual Machine have been released by Sun Microsystems, Inc.

The Java language is an object-oriented programming language which is compiled to run on a Java Virtual Machine ("Java VM"). A Java VM is a computer which runs on top of the existing hardware and operating system of another computer system. Because the specifications for the Java VM have been published, it is possible to write a Java VM to work with any hardware and/or operating system. Java programs are compiled into bytecode, which will run on any Java VM. The Java VM essentially acts as an interpreter between the Java bytecodes and the system on which the Java program is executing.

There are four major components to a Java VM, all of which are implemented in software. The four components are the registers, the operand stack, the garbage collected heap, and the method area. The method area contains the method code (i.e. the compiled Java code) and symbol tables. The compiled Java code, i.e. the bytecode, consists of a set of instructions. Each instruction consists of a one byte opcode followed by any needed operands.

Compiled Java programs are typically referred to as Java class files. Many Java class files are downloaded from the Internet for execution on a user's computer system. One of the first steps performed by a Java VM is called verification. A class-file verifier (part of the Java VM) ensures that the file truly is a Java class file and will execute without violating any Java security restrictions.

The class file verifier first checks to determine if the class file being loaded is of the correct class file format. This is done by examining the first four bytes of the class file. All Java class files must begin with the "magic number" (i.e. 0xCAFEBABE). A version number follows the magic number, and the class file verifier checks to ensure that the class file being loaded is compatible with the VM loading it. The verifier also checks the information in the constant pool and other sections of the class file for consistency.

During the linking phase, the verifier ensures that all classes except for the Object class have a superclass and that all field and method references in the constant pool have valid names, classes, and type descriptors. In addition, the verifier checks the code array of the code attribute for each method to ensure that all local variables contain values of the appropriate type, that methods are called with the appropriate arguments, and that fields are assigned correct values. The verifier also checks the operand stack for correctness.

Finally, during execution, the verifier checks to ensure that a referenced type is allowed for instructions referencing a type. If an instruction modifies a field or calls a method, the verifier checks to ensure that the field or method is available and that the calling method is allowed to access the field or call the method.

Often, developers would like to measure the performance of a particular Java application in order to identify the sources of delay in the application. Typically, however, the developer only has access to the Java class file and not to the source code. This makes it difficult to insert instrumentation code for measuring and analyzing performance. The Java runtime environment currently provides limited support for performance measurement and analysis. In addition, the class file verifier will not typically allow a class file to execute if it does not comply with all requirements noted above. This means that instrumentation code cannot simply be added into the class file, as this would most likely cause the class file verifier to reject the class file. Similar problems occur whenever a developer desires to add, delete, or modify any code in an existing class file. For example, a developer may desire to add code for the purpose of performing benchmark tests or debugging. A developer may also desire to add, delete, or modify code for the purpose of making functional modifications to the class file.

Consequently, it would be desirable to have a system and method for modifying class files by adding, deleting, or modifying code within the class files. It would be desirable to have a system and method which would follow all class file constraints and thus would not cause class files to be rejected by a class file verifier.

SUMMARY OF THE INVENTION

Accordingly, the present invention is directed to a system and method for modifying a class file for the purpose of instrumentation, debugging, benchmarking, or making functional modifications to the class file. In addition, the present invention makes necessary changes to the components of the class file so that the class file will pass the class file verifier before being executed.

The present invention deconstructs a class file into its components and then modifies selected components by adding, deleting, or changing code within the components. The class file is then reconstructed, following all class file constraints imposed by the class file verifier. The present invention also may be used to modify selected code attributes of a network browser (i.e. a web browser) so that downloaded applets are saved to memory and modified before being executed by the information handling system.

One embodiment of the present invention is an information handling system capable of performing the method described above. Another embodiment of the present invention is a computer readable medium containing sets of instructions capable of executing the method described above.

An advantage of the present invention is that class files may be modified without access to the source code. Another advantage of the present invention is that the modified class files will meet all constraints imposed by a class file verifier.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

The invention may be implemented on a variety of hardware platforms, including personal computers, workstations, embedded systems, mini-computers, and mainframe computers. Many of the steps of the method according to the present invention may be advantageously implemented on parallel processors of various types.

Figure 1:
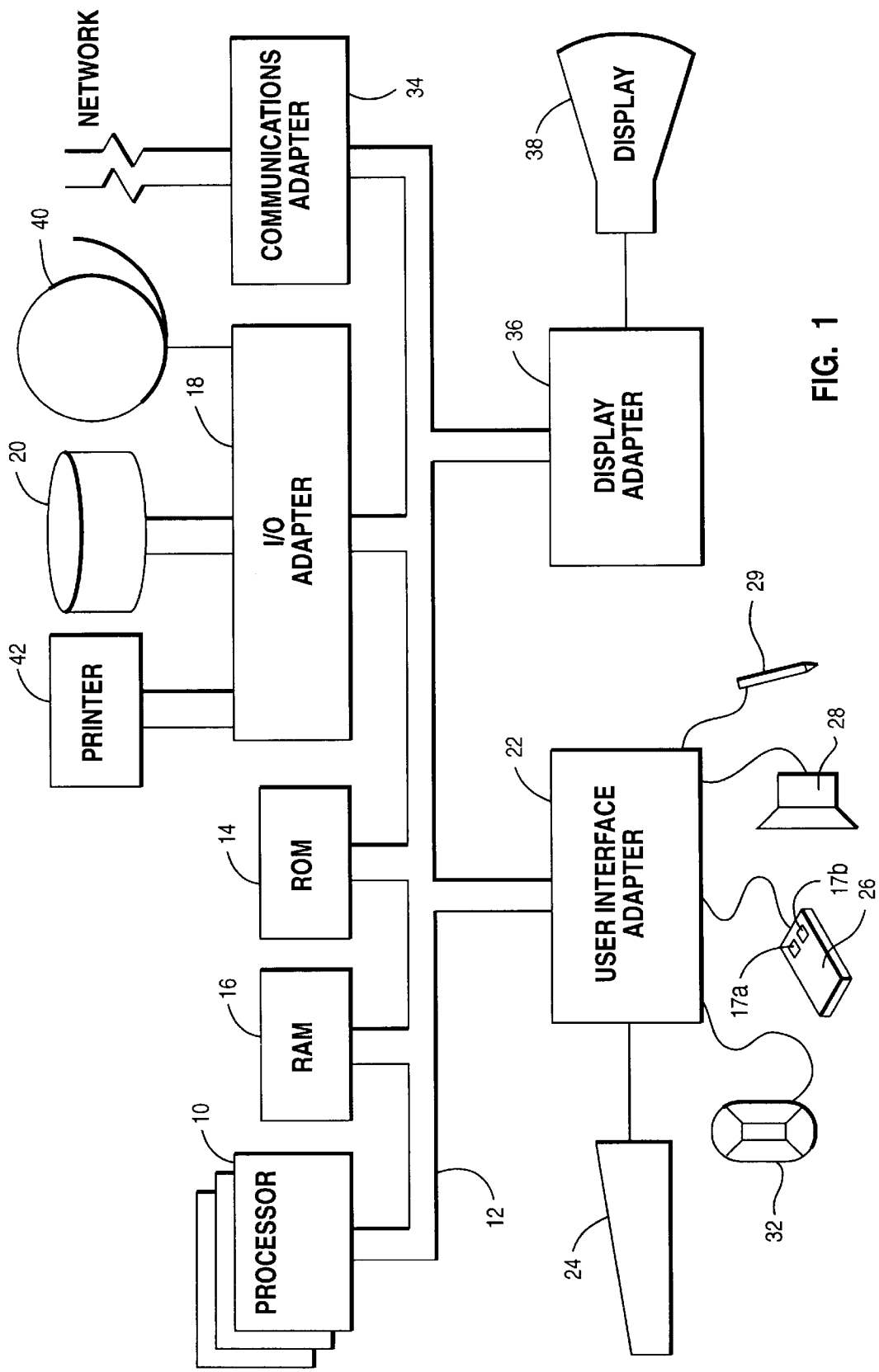
FIG. 1 is a block diagram of an information handling system capable of executing the method of the present invention.

Referring now to FIG. 1, a typical configuration of an information handling system that may be used to practice the novel method of the present invention will be described. The computer system of FIG. 1 has at least one processor 10. Processor 10 is interconnected via system bus 12 to random access memory (RAM) 16, read only memory (ROM) 14, and input/output (I/O) adapter 18 for connecting peripheral devices such as disk units 20 and tape drives 40 to bus 12, user interface adapter 22 for connecting keyboard 24, mouse 26 having buttons 17a and 17b, speaker 28, microphone 32, and/or other user interface devices such as a touch screen device 29 to bus 12, communication adapter 34 for connecting the information handling system to a data processing network, and display adapter 36 for connecting bus 12 to display device 38.

Communication adaptor 34 may link the system depicted in FIG. 1 with hundreds, or even thousands, of similar systems or other devices, such as remote printers, remote servers, or remote storage units. The system depicted in FIG. 1 may be linked to both local area networks (sometimes referred to as Intranets) and wide area networks, such as the Internet.

Figure 2:
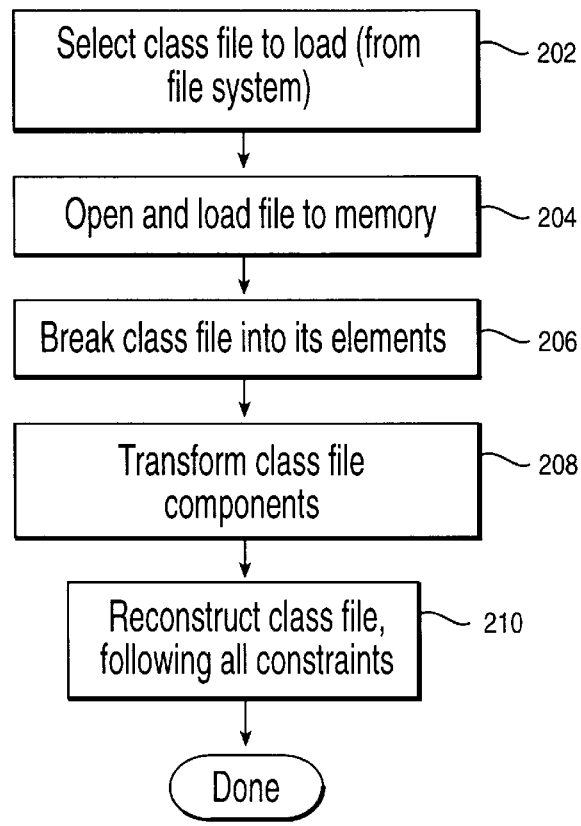
FIG. 2 is a flow chart illustrating a method of loading a class file from a file system and transforming the class file according to the teachings of the present invention.

Referring now to FIG. 2, a method for modifying a class file will now be described. The present invention will be described with reference to modifying a Java class file. The system and method of the present invention may be implemented in any Java VM environment (e.g., IBM JDK, Microsoft SDK, Sun JDK, Sun JavaOS JVM, or Netscape JRE) or on any type of class file where an intermediate code abstraction (e.g., bytecode) is used.

Still referring to FIG. 2, a user first selects a class file to load from a file system (step 202). The selected class file is opened and loaded into memory (step 204). The next step is to break the class file into its many parts, or elements (step 206). Because the Java class file specification is published by Sun Microsystems, Inc., it is possible to parse the class file into its constituent parts. This is typically accomplished with a class file reader. The design and implementation of a class file reader is not discussed here. Given the published class file specification, a skilled programmer could develop and implement a class file reader to break a class file into its elements.

Once the class file has been deconstructed, it can then be transformed, or modified (step 208). The modifications may include any combination of adding, deleting, or modifying code and linkage information. For example, one or more code segments, each consisting of one or more lines of code, may be added at various points throughout the class file. In the preferred embodiment, these lines of code are added to instrument the Java class file for performance reasons. However, a class file may be modified for many reason, including, but not limited to debugging, functional modifications, or benchmarking. After modification, the class file is then reconstructed (step 210). At this point, the class file, or methods within the class file, can be executed as desired by the user. Note that every method within the class file may be instrumented or only some of the methods may be instrumented. If only some of the methods are to be instrumented, it is possible to partially deconstruct the class file and instrument only the desired methods.

Java class files are often downloaded from a network, such as the Internet. The method of the present invention may be practiced on any Java class file, regardless of how the class file is obtained. If the class file is obtained from a network, such as the Internet, it is typically loaded immediately into the Java VM and executed. Such Java class files are not usually saved on the user's hard disk or in a file system. In some cases (e.g., embedded systems), there may not be a hard disk or local file system available. Class files downloaded from a network are typically loaded directly into memory by the Java VM ClassLoader. Therefore, it is necessary to intercept the class file at the loader and transform its memory image directly. This is accomplished by modifying a web browser so that it dynamically modifies class files coming from the network, as described below with reference to FIG. 3. In the described embodiment, the web browser is also a Java file, and thus the same method used to modify the web browser is used to modify downloaded Java class file. Also note that the method of the present invention works even with Java files containing a security signature, as the method of the present invention is used after the security signature verification.

The method of the present invention may be used to modify the web browser. For example, a Java enabled web browser includes Java Runtime class files, which are used to run Java applets coming across the network. The Java Runtime is modified, using the method of the present invention so that it provides functionality to modify all class files that the Runtime loads across the network for subsequent execution. In other words, the method of the present invention is invoked twice—first, to modify the web browser, and second to cause the web browser to modify a downloaded class file.

Figure 3:
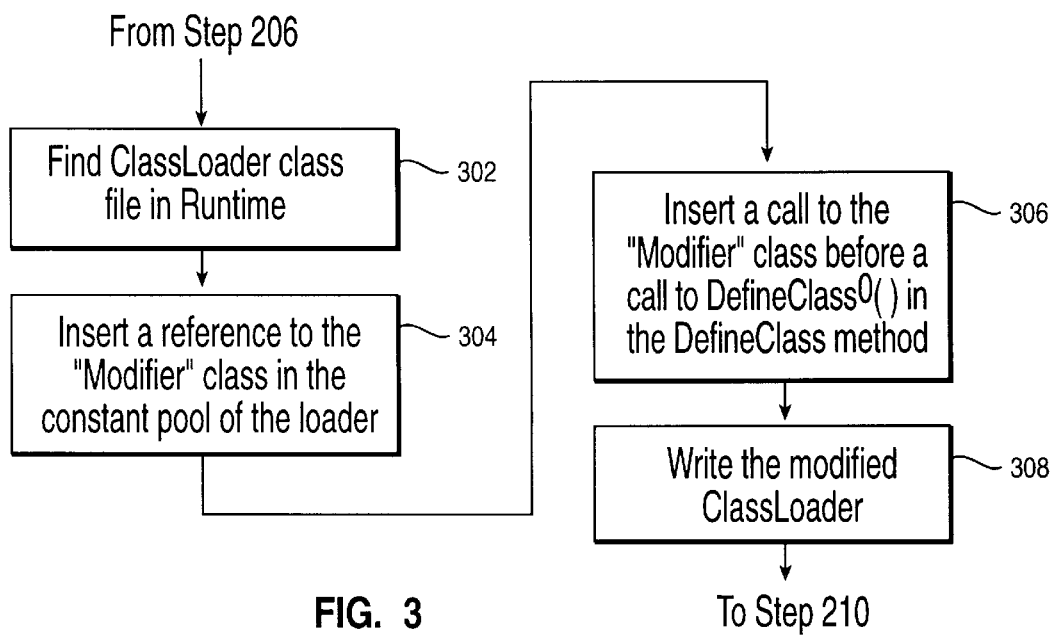
FIG. 3 is a flow chart illustrating a method of modifying a network browser according to the teachings of the present invention.

Referring now to FIG. 3, a method for modifying a network browser, or web browser, is illustrated. Note that the web browser class files are typically stored in the file system. The first step then is to locate the ClassLoader file, which is part of the Runtime class files (step 302). A reference to the Modifier class is inserted in the constant pool section of the ClassLoader (step 304). Next, a call to the modifier class is inserted into the ClassLoader instance at a point where it has received the class file and is about to give it to the VM to be instantiated (step 306). The modifications to the received class are carried out in a call to the "MODIFIER class." Finally, the modified ClassLoader is saved (step 308). The user may then proceed to select class files to download and modify from a network, such as the Internet.

Figure 4:
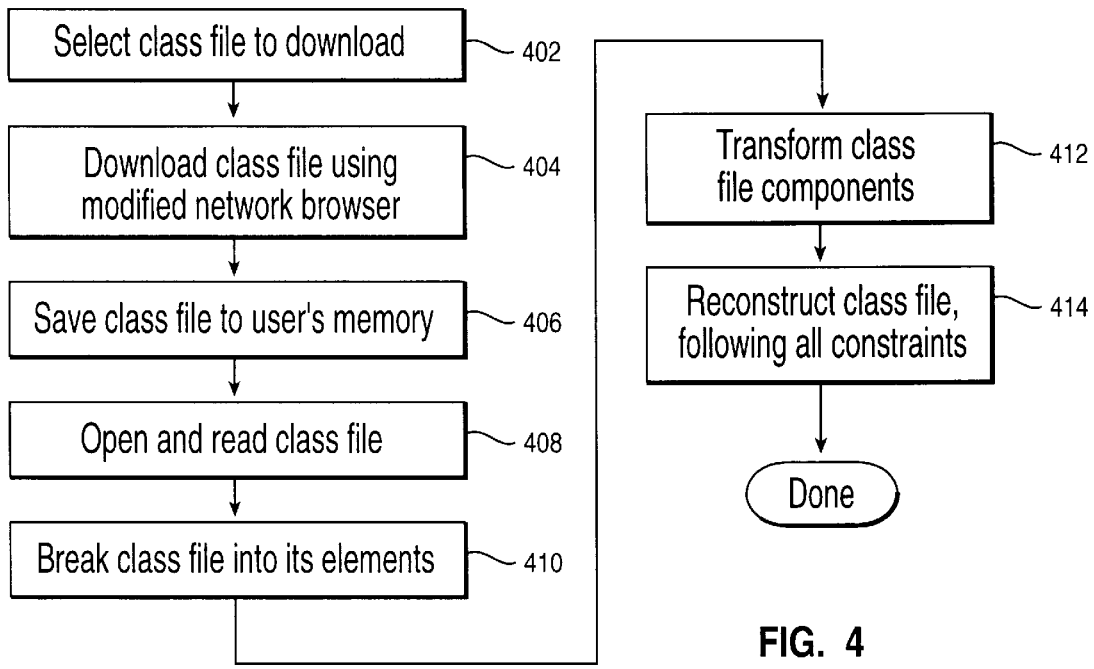
FIG. 4 is a flow chart illustrating a method of downloading a class file from a network using the modified browser from FIG. 3 and transforming the downloaded class file according to the teachings of the present invention.

Referring now to FIG. 4, a method for downloading and modifying class files from a network will now be described. As shown in FIG. 4, a user selects a class file to download (step 402). The class file is downloaded using a web browser which has been modified according to the method described above with reference to FIG. 3 (step 404). The class file is then saved to a memory area (step 406). The remaining steps are as discussed in FIG. 2. The class file is opened and loaded (step 408), broken into elements (step 410), transformed (step 412), and then reconstructed (step 414).

Figure 5:
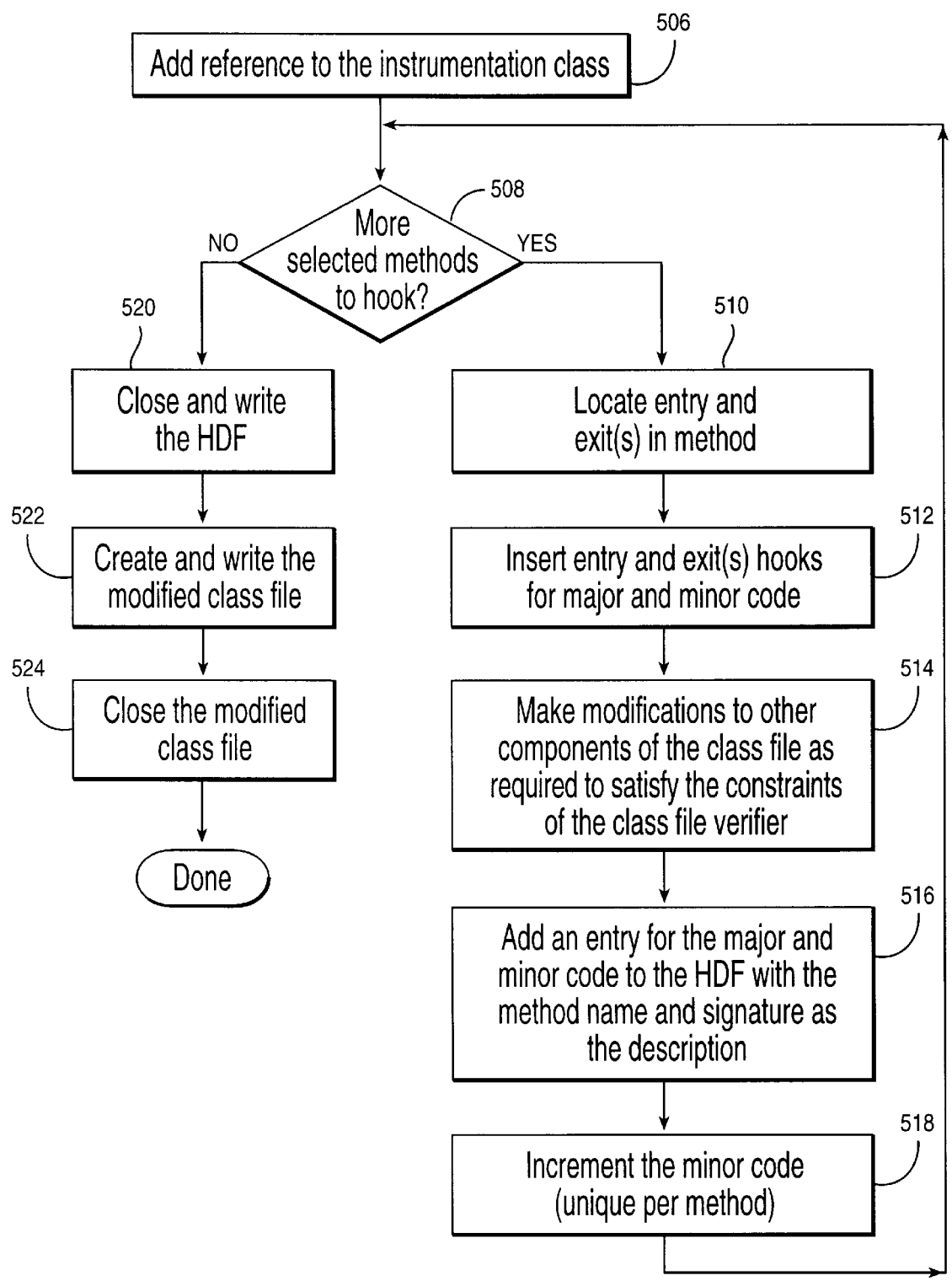
FIG. 5 is a flow chart illustrating one embodiment of the present invention.

Referring now to FIG. 5, additional details regarding the method of the present invention will now be described. FIG. 5 illustrates one embodiment of the present invention, i.e. adding code for the purpose of instrumentation. Code may be added to, deleted from, or modified in the Java class file for many reasons, including instrumentation, benchmarking, performance tuning, modifying functionality, applying functional or performances patches, etc. While the invention will be described with reference to adding instrumentation code for the purpose of performance measurement and analysis, this is not meant to limit the present invention.

FIG. 5 illustrates the steps of transforming the class file components and then reconstructing the class file, specifically for the purpose of adding performance instrumentation code at the entry and exit of every method contained in the class file. This is, of course, only one embodiment of the present invention, and is discussed in detail for illustrative purposes. The unique system and method of the present invention may be used for many purposes, as discussed above.

Every method in a class file has a unique method signature. The method signature is not the same as the security signature discussed above. A method signature is a string containing the method name and an encoding of the number and types of formal parameters to the method. The Java language specification describes this encoding in such a way as to guarantee uniqueness for every method in a class. For example, a method referred to as "method_X" which takes a single integer as a formal parameter would have the method signature "method_X(I). A class file can not have two methods with the same method signature. If code is written such that a class file would have two methods with the same method signature, a compiler error occurs. The performance instrumentation takes the form of a trace hook that is written to a trace facility every time the instrumented method is either entered or exited. Each hook is uniquely identified with a major code and a minor code.

Referring now to FIG. 5, assume that a class file has been opened, and a hook definition file (HDF) has also been opened for creation. The HDF will be used to record information about the mapping between specific trace hook major and minor codes and the methods into which they are being inserted. For example, consider class "TEST" having two methods, <method_X> and <method_Y>. As each method is instrumented with an entry and exit hook, entries will be made in the HDF file that identify the major and minor codes for those hooks, along with the class name and method signature. The entries, for example, may look as follows:

| major/minor | class/method |
|---|---|
| 22/01 | TEST.method_X(I) |
| 22/81 | TEST.method_X_exit |
| 22/02 | TEST.method_Y() |
| 22/82 | TEST.method_Y_exit |

In the above excerpt from a possible HDF file, major code 22 and minor code 01 are associated with the trace hook placed at the entry of method_X in class TEST. The method signature (e.g., "(I)") is recorded to allow for clear discrimination between overloaded methods (i.e. class constructors are frequently overloaded, and the only way to discriminate between one constructor and the other is to examine the method signature).

Note that an HDF file is not a requirement but serves as an optimization in implementing the trace hooks. The resulting trace stream consists of sequences of major/minor codes (with time stamps). A postprocessing phase takes the HDF file and merges it with a trace stream, resulting in a trace stream that identifies methods/classes by name. The following is an example of a trace stream that may be generated by merging trace data with the above HDF file:

| major | minor | timestamp | description |
|---|---|---|---|
| 12 | 1 | 15:985860940 | Dispatch thread: e18507a0 |
| 22 | 1 | 15:985833507 | ENTRY: TEST.method_X(I) |
| 12 | 1 | 15:985845671 | Dispatch thread: e17d5bb0 |
| 12 | 1 | 15:985860940 | Dispatch thread: e1807a0 |
| 22 | 81 | 15:985833507 | EXIT: TEST.method_X_exit |
| 22 | 2 | 15:985833507 | ENTRY: TEST.method_Y() |
| 22 | 82 | 15:985833507 | EXIT: TEST.method_Y_exit |

As shown in FIG. 5, a reference to the instrumentation class is added into the constant pool section of the class file (step 506). While there are more methods to hook (step 508), the following steps are performed. For each method, the entry point and one or more exit points are located (step 510). An entry hook and exit hooks are inserted for the major and minor codes (step 512). Selective instrumentation is possible if only some of the methods are to be instrumented. In the described embodiment, an inclusion/exclusion list is used to specify which methods are to be instrumented. However, any number of procedures may be used to determine whether a particular method is to be instrumented or to specify which methods are to be instrumented.

On entry into a method, the following invocation is inserted:

instrumentation Library.log(major_code,minor_code);

Just prior to returning from the method, the following invocation is inserted:

instrumentation Library.log(major_code,minor_code);

There are often several exit points for a single method, and each exit point must be so instrumented. At postprocessing time, the major codes and minor codes are resolved with specific method and class names from the HDF file. This allows collection to proceed without the overhead of recording large amounts of double-byte string data.

Bytecode modification requires the insertion of Java bytecode instructions that affect the method invocations noted above. Insertion requires the identification of method bodies, interpretation of existing bytecodes, and location of entry and exit points. It is critical that the modifications be consistent with the criteria employed by the class file verifier. The class file verifier ensures that the bytecode, and the rest of the class file, is valid and can be executed by the Java VM. Thus, the next step is to modify the other components of the class file to ensure that they satisfy the constraints of the class file verifier (step 514). Further details regarding step 514 are described below with reference to FIG. 6.

Next, an entry is added to the HDF (step 516). The entry includes the major and minor codes, and method signature as the description. The minor code is then incremented to ensure that it is unique for each method (step 518).

When there are no more methods to hook, the HDF is closed and written to the file system (step 520). The modified class file is then created (step 522) and closed (step 524). The modified, or transformed, class file is then ready to be executed.

Figure 6:
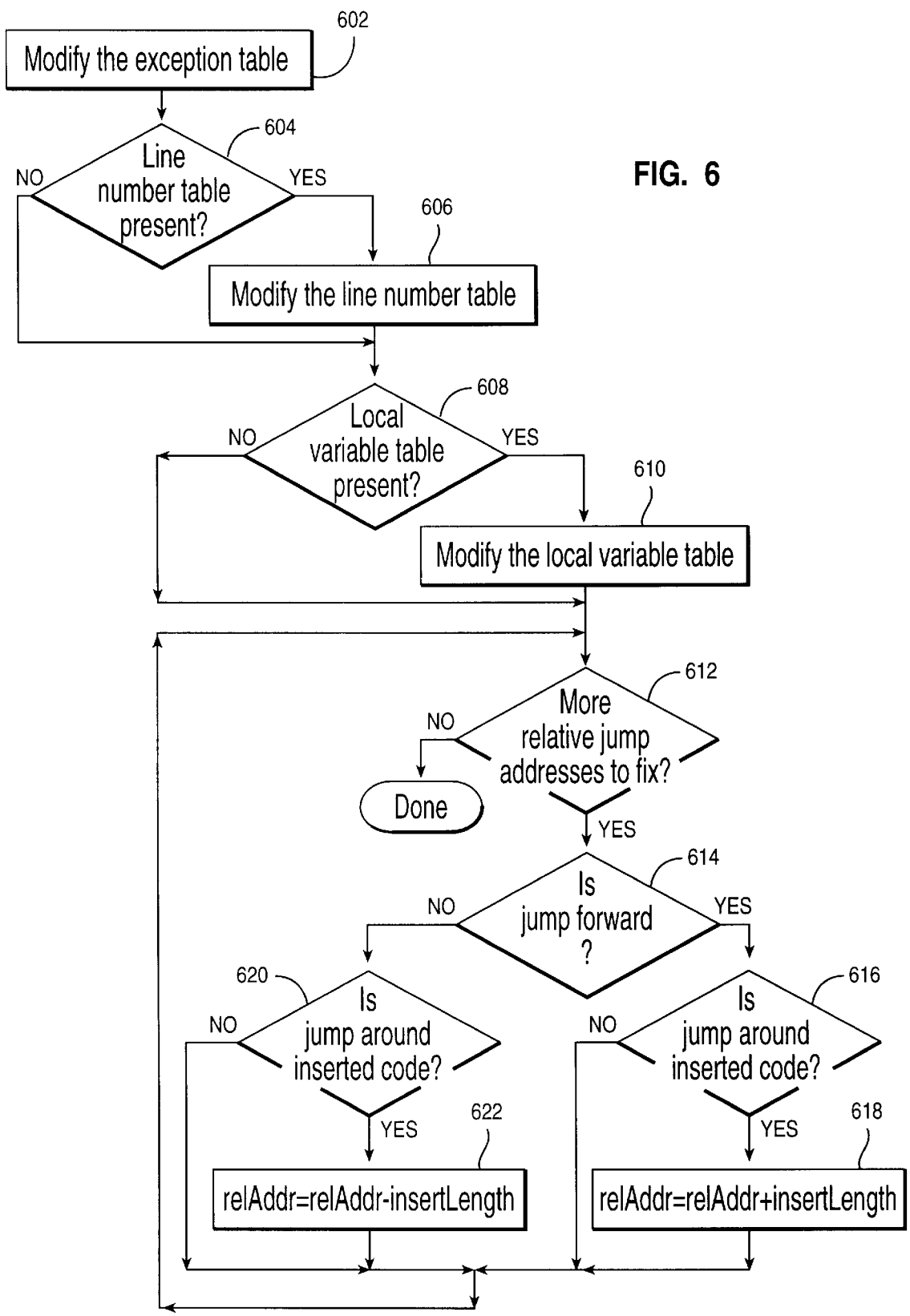
FIG. 6 is a flow chart illustrating further details regarding the changes that must be made to transformed code in order to satisfy a class file verifier.

Step 514 is depicted in greater detail in FIG. 6. As code is inserted in the existing stream for each method, verification is ensured by:

1. Creating constant pool entries for the instrumentation class and methods (steps 506 and 516 in FIG. 5).
2. Ensuring code that is moved is correctly relocated, and that all related references are adjusted for the relocation (step 514).

As shown in FIG. 6, several steps must be taken to ensure that code which is moved due to either insertions or deletions is correctly relocated and related references are adjusted. First, the exception table is modified (step 602). In Java, an exception handler may be set up to handle specific exceptions that occur at specified line numbers. Adding or deleting code may change the line numbers associated with a particular exception handler. Therefore, the exception table may need to be adjusted so that the correct exception handler is called for exceptions which occur at certain line numbers.

If a line number table is present (step 604), it is modified (step 606). Similarly, if a local variable table is present (step 608), it is modified (step 610). For each relative jump address (step 612), it is first determined if the jump is a jump forward (step 614). If so, the next step is to determine if it is a jump around inserted code (step 616). If it is, the relative address is incremented by the insert length (step 618). If the jump is a jump backward (answer to step 614 is "no"), and the jump is around inserted code (step 620), then the relative address is decremented by the insert length (step 622).

In the described embodiment, the instrumentation class is a separate and distinct Java class. Of course, different types of classes are used for different purposes. If the purpose of the code modifications is to change the functionality of the code, rather than to instrument the code, a different type of class may be used. There is also no requirement that the instrumentation class be a Java class. The instrumentation class could be a native class, and one skilled in the art would appreciate that appropriate linkages would have to be established in order to make calls to the native class.

In the described embodiment, the instrumentation class exports several methods, including:

1. log: Used to log entry/exit (or any other control point). Note that serialization is provided to ensure that more than one instrumented class can log simultaneously. Also note that logging will alternately be to a hardware or software trace capability, and logging may exploit native machine methods (i.e. methods that are written in assembly code, rather than Java) that make use of efficient machine timestamp acquisition.
2. Init: Initialized logging capability (e.g., allocates a buffer).
3. Dump: Produces an output file of logged data.

The following example depicts the source code of a Java class file being instrumented, a disassembly of the class file before it is hooked, and a disassembly of the same class file after it is hooked. The example depicts how code (i.e. methods) in the class file can be modified. In this particular case, instrumentation hooks are inserted at method entry and exit(s) for performance measurement. Notice how the major and minor code for the hook is pushed on the stack with the short integer push ("sipush") instructions before a call (invokestatic instruction) is made to the "log" method of the instrumentation class. Three Java VM instructions are inserted for each entry or exit hook. Also note that in some cases, dummy instructions (e.g., iconst_0 and pop2) may be added to keep the inserted code size in multiples of four. This is done because some specific bytecode instructions require 4-byte alignment. In the example below, none of the instructions require 4-byte alignment; however, the dummy instructions are added as part of the described embodiment.

```
/* A Java class file named hello.java */
class hello
{
    public static void main(String args[])
    {
        System.out.println("Hello, how are you today?");
    }
}
/* A disassembly of hello.class before it is hooked */
compiled from hello.java
synchronized class hello extends java.lang.Object
    /* ACC_SUPER bit set */
{
    public static void main(java.lang.String[]);
    hello();
}
Method void main(java.lang.String[]);
    0 getstatic #7 <Field java.io.PrintStram out>
    3 ldc #1 <String "Hello, how are you today?">
    5 invokevirtual #8
        <Method void println(java.lang.String)>
    8 return
Method hello()
    0 aload_0
    1 invokespecial #6 <Method java.lang.Object()>
    4 return
/* A disassembly of hello.class after it is hooked */
Compiled from hello.java
synchronized class hello extends java.lang.Object
    /* ACC_SUPER bit set */
{
    public static void main(java.lang.String[]);
    hello();
}
Method void main(java.lang.STring[])
    0 sipush 2560
    3 sipush 1
    6 invokestatic #37 <Method void log(int,int)>
    9 iconst_0
    10 iconst_0
    11 pop2
    12 getStatic #7 <Field java.io.PrintStream out>
    15 ldc #1 <String "Hello, how are you today?">
    17 invokevirtual #8
        <Method void println(java.lang.String)>
    20 sipush 2688
    23 sipush 1
    26 invokestatic #37 <Method void log(int,int)>
    29 iconst_0
    30 iconst_0
    31 pop2
    32 return
Method hello()
    0 sipush 2560
    3 sipush 2
```

-continued

```
6  invokestatic #37 <Method void log(int,int)>
9  iconst_0
10 iconst_0
11 pop2
12 aload_0
13 invokespecial #6 <Method java.lang.Object()>
16 sipush 2688
19 sipush 2
22 invokestatic #37 <Method void log(int,int)>
25 iconst_0
26 iconst_0
27 pop2
28 return
```

Figure 7:
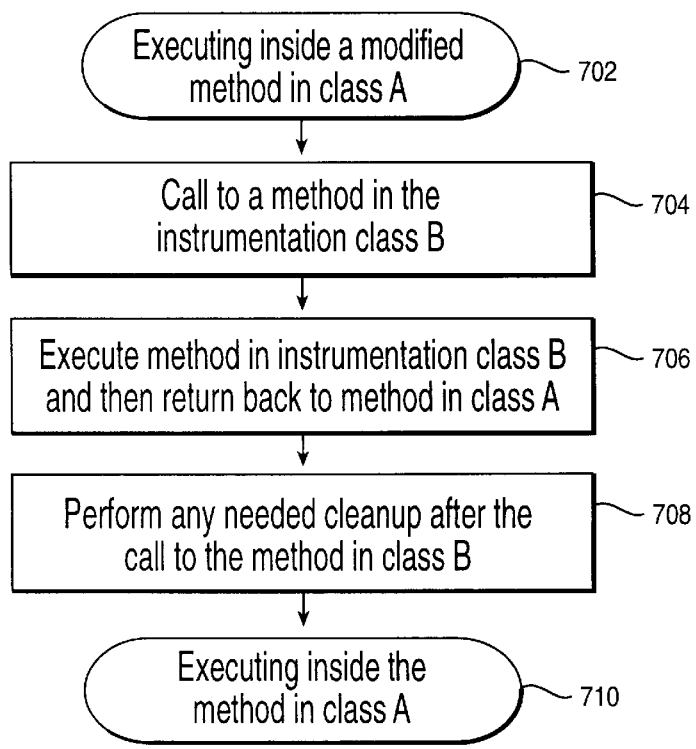
FIG. 7 is a flow chart illustrating the execution of a modified method.

Referring now to FIG. 7, which shows a flow chart of the execution of a modified method, as shown at step 702, the code is executing inside a modified method in class A. The reader will recall that code was injected in class A, such as the instrumentation hooks, as was described in the foregoing example. Those skilled in the art will appreciate that other types of code performing other functions could be called by the injected code according to the present invention. This is done before calling the instrumentation class to allow for performance measurement. The injected code in class A calls a method in class B (Step 704), preferably a Java class. The called method is executed in class B, e.g., an instrumentation method, and then returns back to the method in class A (step 706) to the code injected in class A (step 708). At this point, any needed clean-up is performed by the injected code in class A (step 708). Execution inside the method in class A then continues (step 710). As described above, the called method could be in native code not necessarily associated with a given Java class.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 16 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for modifying a class file, comprising the steps of:

deconstructing the class file into one or more class file components;

modifying one or more of the class file components, wherein said modifying includes the following steps:
   selecting one or more methods in the class file;
   adding one or more lines of code to an entry point in each selected method; and
   adding one or more lines of code to one or more exit points in each selected method;

reconstructing the class file; and verifying the reconstructed class file to ensure that it will work in its intended operating environment.

2. A method for modifying a class file according to claim 1, wherein said deconstructing step is performed by a class file reader.

3. A method for modifying a class file according to claim 1, wherein said modifying step further comprises the step of modifying a constant pool section of the class file.

4. A method for modifying a class file according to claim 1, wherein said modifying step further comprises the step of modifying one or more code attributes of the class file.

5. A method for modifying a class file according to claim 1, wherein said modifying step further comprises the step of modifying an exception table.

6. A method for modifying a class file according to claim 1, wherein said modifying step further comprises the step of modifying a line number table.

7. A method for modifying a class file according to claim 1, wherein said modifying step further comprises the step of modifying a local variable table.

8. A method for modifying a class file according to claim 1, wherein said modifying step further comprises the step of modifying one or more relative jump addresses.

9. A method for modifying a class file according to claim 1, wherein said modifying step further comprises the step of writing an entry into a definition file for each modified class file component.

10. A method for modifying a class file according to claim 9, wherein the entry comprises a major code, a minor code, a class name, and a method signature.

11. A method for modifying a class file according to claim 1, wherein said verifying step comprises the step of verifying that the reconstructed class file follows one or more constraints imposed by a class file verifier.

12. A method for modifying a class file according to claim 1, wherein the class file is a Java class file, and wherein said verifying step comprises the step of verifying that the reconstructed Java class file will execute in a Java virtual machine environment.

13. A method for modifying a class file according to claim 1, wherein said modifying step comprises the step of adding instrumentation code to one or more of the class file components.

14. A method for modifying a class file according to claim 1, wherein said modifying step comprises the step of adding code to one or more of the class file components in order to change the functionality of the class file components.

15. A method for modifying a class file according to claim 1, wherein said modifying step comprises the step of deleting code from one or more of the class file components in order to change the functionality of the class file components.

16. A method for modifying a class file according to claim 1, wherein the class file contains a security signature.

17. A method for modifying a class file, comprising the steps of:

deconstructing a class file loader into one or more class file loader components;

modifying one or more of the class file loader components;

reconstructing the class file loader, wherein the reconstructed class file loader follows one or more class file constraints imposed by a class file verifier;

downloading a class file using the modified class file loader;

deconstructing the class file into one or more class file components;

modifying one or more of the class file components; and reconstructing the class file, wherein the reconstructed class file follows the one or more class file constraints imposed by the class file verifier.

18. A method for modifying a class file according to claim 17, wherein said downloading step further comprises the step of intercepting the class file and transforming its memory image.

19. A method for intercepting and modifying a class file as it is being downloaded from a network, comprising the steps of:

deconstructing a class file loader into one or more class file loader components;

modifying one or more of the class file loader components;

reconstructing the class file loader, wherein the reconstructed class file loader follows one or more class file constraints imposed by a class file verifier;

downloading a class file using the modified class file loader;

deconstructing the class file into one or more class file components;

modifying one or more of the class file components; and reconstructing the class file, wherein the reconstructed class file follows the one or more class file constraints imposed by the class file verifier.

20. A method for executing a Java applet, comprising the steps of:

accepting the Java applet from a server;

modifying the Java applet by injecting linkage information to a new method into the Java applet; and executing the modified Java applet wherein the modified Java applet calls the new method as part of its execution.

21. A method for executing a Java applet according to claim 20, wherein said modifying step comprises the steps of:

deconstructing a class file loader into one or more class file loader components, wherein the class file loader is a program within a browser;

modifying one or more of the class file loader components;

reconstructing the class file loader, wherein the reconstructed class file loader follows one or more class file constraints imposed by a class file verifier;

downloading a class file using the modified class file loader;

deconstructing the class file into one or more class file components;

modifying one or more of the class file components; and reconstructing the class file, wherein the reconstructed class file follows the one or more class file constraints imposed by the class file verifier.

22. An information handling system, comprising:

one or more processors;

memory means for storing instructions and data for use by the processors;

one or more images of an operating system for controlling the operation of the processors;

an input/output system for communicating information to and from peripheral devices;

at least one system bus connecting the elements of the system for efficient operation; and means for modifying a class file, wherein said means for modifying a class file includes:

means for deconstructing the class file into one or more class file components;

means for modifying one or more of the class file components, wherein said means for modifying one or more of the class file components includes:

means for selecting one or more methods in the class file;

means for adding one or more lines of code to an entry point in each selected method; and means for adding one or more lines of code to one or more exit points in each selected method;

means for reconstructing the class file; and means for verifying the reconstructed class file to ensure that it will work in its intended operating environment.

23. The information handling system of claim 22 wherein the class file is a Java class file.

24. The information handling system of claim 22 wherein the means for modifying one or more of the class file components further comprises means for adding instrumentation code to one or more of the class file components.

25. An information handling system, comprising:

one or more processors;

memory means for storing instructions and data for use by the processors;

one or more images of an operating system for controlling the operation of the processors;

an input/output system for communicating information to and from peripheral devices;

at least one system bus connecting the elements of the system for efficient operation;

means for modifying a class file comprising:

means for deconstructing a class file loader into one or more class file loader components;

means for modifying one or more of the class file loader components;

means for reconstructing the class file loader, wherein the reconstructed class file loader follows one or more class file constraints imposed by a class file verifier;

means for downloading a class file using the modified class file loader;

means for deconstructing the class file into one or more class file components;

means for modifying one or more of the class file components; and means for reconstructing the class file, wherein the reconstructed class file follows the one or more class file constraints imposed by the class file verifier.

26. An information handling system, comprising:

one or more processors;

memory means for storing instructions and data for use by the processors;

one or more images of an operating system for controlling the operation of the processors;

an input/output system for communicating information to and from peripheral devices;

at least one system bus connecting the elements of the system for efficient operation;

means for intercepting and modifying a class file as it is being downloaded from a network, comprising:

means for deconstructing a class file loader into one or more class file loader components;

means for modifying one or more of the class file loader components;

means for reconstructing the class file loader, wherein the reconstructed class file loader follows one or more class file constraints imposed by a class file means for downloading a class file using the modified class file loader;

means for deconstructing the class file into one or more class file components;

means for modifying one or more of the class file components; and means for reconstructing the class file, wherein the reconstructed class file follows the one or more class file constraints imposed by the class file verifier.

27. An information handling system, comprising:

one or more processors;

memory means for storing instructions and data for use by the processors;

one or more images of an operating system for controlling the operation of the processors;

an input/output system for communicating information to and from peripheral devices;

at least one system bus connecting the elements of the system for efficient operation;

means for executing a Java applet comprising:
means for accepting the Java applet from a server;
means for modifying the Java applet by injecting a new class into the Java applet; and
means for executing the modified Java applet.

28. The information handling system of claim 27 wherein the means for modifying further comprises:

means for deconstructing a class file loader into one or more class file loader components, wherein the class file loader is a program within a browser;

means for modifying one or more of the class file loader components;

means for reconstructing the class file loader, wherein the reconstructed class file loader follows one or more class file constraints imposed by a class file verifier;

means for downloading a class file using the modified class file loader;

means for deconstructing the class file into one or more class file components;

means for modifying one or more of the class file components; and means for reconstructing the class file, wherein the reconstructed class file follows the one or more class file constraints imposed by the class file verifier.

29. A computer readable medium, comprising:

means for modifying a class file comprising:
means for deconstructing a class file loader into one or more class file loader components;
means for modifying one or more of the class file loader components;
means for reconstructing the class file loader, wherein the reconstructed class file loader follows one or more class file constraints imposed by a class file verifier;
means for downloading a class file using the modified class file loader;
means for deconstructing the class file into one or more class file components;
means for modifying one or more of the class file components; and
means for reconstructing the class file, wherein the reconstructed class file follows the one or more class file constraints imposed by the class file verifier.

30. A computer readable medium, comprising:

means for intercepting and modifying a class file as it is being downloaded from a network, comprising:
means for deconstructing a class file loader into one or more class file loader components;
means for modifying one or more of the class file loader components;
means for reconstructing the class file loader, wherein the reconstructed class file loader follows one or more class file constraints imposed by a class file verifier;
means for downloading a class file using the modified class file loader;
means for deconstructing the class file into one or more class file components;
means for modifying one or more of the class file components; and
means for reconstructing the class file, wherein the reconstructed class file follows the one or more class file constraints imposed by the class file verifier.

31. A computer readable medium, comprising:

means for executing a Java applet comprising:
means for accepting the Java applet from a server;
means for modifying the Java applet by injecting a new class into the Java applet; and
means for executing the modified Java applet.

32. A method for modifying a class file, comprising the steps of:

deconstructing the class file into one or more class file components;

modifying one or more of the class file components, wherein said modifying includes the step of writing an entry into a definition file for each modified class file component;

reconstructing the class file; and verifying the reconstructed class file to ensure that it will work in its intended operating environment.

33. A method for modifying a class file according to claim 32, wherein said deconstructing step is performed by a class file reader.

34. A method for modifying a class file according to claim 32, wherein said modifying step further comprises the step of modifying a constant pool section of the class file.

35. A method for modifying a class file according to claim 32, wherein said modifying step further comprises the step of modifying one or more code attributes of the class file.

36. A method for modifying a class file according to claim 32, wherein said modifying step further comprises the step of modifying an exception table.

37. A method for modifying a class file according to claim 32, wherein said modifying step further comprises the step of modifying a line number table.

38. A method for modifying a class file according to claim 32, wherein said modifying step further comprises the step of modifying a local variable table.

39. A method for modifying a class file according to claim 32, wherein said modifying step further comprises the step of modifying one or more relative jump addresses.

40. A method for modifying a class file according to claim 32, wherein the entry comprises a major code, a minor code, a class name, and a method signature.

41. A method for modifying a class file according to claim 32, wherein said verifying step comprises the step of verifying that the reconstructed class file follows one or more constraints imposed by a class file verifier.

42. A method for modifying a class file according to claim 32, wherein the class file is a Java class file, and wherein said verifying step comprises the step of verifying that the reconstructed Java class file will execute in a Java virtual machine environment.

43. A method for modifying a class file according to claim 32, wherein said modifying step comprises the step of adding instrumentation code to one or more of the class file components.

44. A method for modifying a class file, the class file containing a security signature, comprising the steps of:

deconstructing the class file into one or more class file components;

modifying one or more of the class file components;

reconstructing the class file; and verifying the reconstructed class file to ensure that it will work in its intended operating environment.

45. A method for modifying a class file according to claim 44, wherein said deconstructing step is performed by a class file reader.

46. A method for modifying a class file according to claim 44, wherein said modifying step further comprises the step of modifying a constant pool section of the class file.

47. A method for modifying a class file according to claim 44, wherein said modifying step further comprises the step of modifying one or more code attributes of the class file.

48. A method for modifying a class file according to claim 44, wherein said modifying step further comprises the step of modifying an exception table.

49. A method for modifying a class file according to claim 44, wherein said modifying step further comprises the step of modifying a line number table.

50. A method for modifying a class file according to claim 44, wherein said modifying step further comprises the step of modifying a local variable table.

51. A method for modifying a class file according to claim 44, wherein said modifying step further comprises the step of modifying one or more relative jump addresses.

52. A method for modifying a class file according to claim 44, wherein said verifying step comprises the step of verifying that the reconstructed class file follows one or more constraints imposed by a class file verifier.

53. A method for modifying a class file according to claim 44, wherein the class file is a Java class file, and wherein said verifying step comprises the step of verifying that the reconstructed Java class file will execute in a Java virtual machine environment.

54. A method for modifying a class file according to claim 44, wherein said modifying step comprises the step of adding instrumentation code to one or more of the class file components.

* * * * *

UNITED STATES PATENT AND TRADEMARK OFFICE
CERTIFICATE OF CORRECTION

PATENT NO. : 6,026,237
DATED : February 15, 2000
INVENTOR(S) : Berry, et al.

It is certified that error appears in the above-indentified patent and that said Letters Patent is hereby corrected as shown below:

Column 13, line 7, after the second occurrence of "file" please add --verifier--.

Signed and Sealed this

Sixth Day of March, 2001

Attest:

NICHOLAS P. GODICI

Attesting Officer     Acting Director of the United States Patent and Trademark Office